United States Patent
O'Leary et al.

(10) Patent No.: US 6,878,938 B2
(45) Date of Patent: Apr. 12, 2005

(54) HIGH FREQUENCY INFRARED RADIATION SOURCE

(75) Inventors: Robert K. O'Leary, Newton, MA (US); William Manning, Walpole, MA (US); Christopher G. Poirier, Salem, MA (US); David Jacobsen, Essex, MA (US); David Vidal, Amesbury, MA (US)

(73) Assignee: PerkinElmer, Inc., Wellesley, MA (US)

( * ) Notice: Subject to any disclaimer, the term of this patent is extended or adjusted under 35 U.S.C. 154(b) by 0 days.

(21) Appl. No.: 10/620,886

(22) Filed: Jul. 16, 2003

(65) Prior Publication Data

US 2005/0012053 A1 Jan. 20, 2005

(51) Int. Cl.[7] .................................................. G01J 5/26
(52) U.S. Cl. .................................... 250/332; 250/495.1
(58) Field of Search ............................ 250/338.3, 342, 250/353, 332, 343, 504 R, 493.1, 330, 334

(56) References Cited

U.S. PATENT DOCUMENTS

| | | | |
|---|---|---|---|
| 4,067,320 A | 1/1978 | Olsson et al. | |
| 4,446,869 A | 5/1984 | Knodle | |
| 4,560,875 A | 12/1985 | Crowder | |
| 4,633,128 A | 12/1986 | Roberts et al. | |
| 4,678,488 A | 7/1987 | Howard et al. | |
| 4,951,661 A | 8/1990 | Sladek | |
| 5,067,492 A | 11/1991 | Yelderman et al. | |
| 5,131,387 A | 7/1992 | French et al. | |
| 5,166,075 A | 11/1992 | Fehder | |
| 5,213,109 A | 5/1993 | Susi | |
| 5,261,415 A | 11/1993 | Dussault | |
| 5,320,096 A | 6/1994 | Hans | |
| 5,399,931 A | 3/1995 | Roberts | |
| 5,401,966 A | 3/1995 | Gray et al. | |
| 5,438,233 A | * 8/1995 | Boland et al. ............... 313/110 |
| 5,445,160 A | 8/1995 | Culver et al. | |
| 5,450,758 A | 9/1995 | Smoll | |
| 5,482,031 A | 1/1996 | Lambert | |
| 5,577,494 A | 11/1996 | Kuypers et al. | |
| 5,590,644 A | 1/1997 | Rosenkoetter | |
| 5,616,158 A | 4/1997 | Biendarra et al. | |
| 5,616,923 A | 4/1997 | Rich et al. | |
| 5,657,750 A | 8/1997 | Colman et al. | |
| 5,782,825 A | 7/1998 | Anderson | |
| 5,782,895 A | 7/1998 | Zarate et al. | |
| 5,829,428 A | 11/1998 | Walters et al. | |
| 5,932,877 A | 8/1999 | Braig et al. | |
| 5,939,726 A | * 8/1999 | Wood ..................... 250/504 R |
| 5,957,127 A | 9/1999 | Yamamori et al. | |
| 5,997,483 A | 12/1999 | Johnson | |
| 6,031,970 A | * 2/2000 | Nordal et al. ............... 392/407 |
| 6,044,843 A | 4/2000 | O'Neil et al. | |
| 6,095,986 A | 8/2000 | Braig et al. | |
| 6,097,034 A | 8/2000 | Weckstrom et al. | |
| 6,133,569 A | * 10/2000 | Shoda et al. ................. 250/332 |
| 6,190,327 B1 | 2/2001 | Isaacson et al. | |
| 6,325,978 B1 | 12/2001 | Labuda et al. | |
| 6,330,883 B1 | 12/2001 | Berger | |
| 6,390,987 B1 | 5/2002 | Graham | |
| 2002/0153490 A1 | 10/2002 | O'Leary | |
| 2003/0024528 A1 | 2/2003 | Graham | |

OTHER PUBLICATIONS

U.S. Appl. No. 10/443,696, filed May 22, 2003, Graham et al.

* cited by examiner

*Primary Examiner*—Nikita Wells
*Assistant Examiner*—Johnnie L Smith, II
(74) *Attorney, Agent, or Firm*—Iandiorio & Teska

(57) ABSTRACT

A high frequency infrared radiation source including a hermetically sealed chamber with a plasma generating gas therein, a pair of spaced electrodes in the chamber for creating a plasma therebetween, a window in the chamber, and a collimating lens made of infrared radiation transmissive material disposed between the pair of electrodes and the window.

34 Claims, 8 Drawing Sheets

HIGH FREQUENCY INFRARED RADIATION SOURCE

FIELD OF THE INVENTION

This invention relates to a high frequency infrared radiation source useful in, inter alia, spectroscopy and capnography systems.

BACKGROUND OF THE INVENTION

Sources of infrared radiation are widely used in instrumentation such as spectroscopy and capnographs (e.g., $CO_2$ sensors) but, to date, have all been resistive type sources which are frequency limited and exhibit a high thermal mass. In the prior art, pulsing the infrared radiation source was accomplished either with a mechanical chopper wheel or a scanning mirror placed in front of the source; or by alternately energizing and deenergizing the filament. Besides the disadvantages associated with the many moving parts associated with chopper wheels and the cost of scanning mirrors, there is a limit to the frequencies which can be obtained. Energizing and deenergizing the filament requires high power requirements and, because of the thermal mass of the filament, the frequencies associated with this method are undesirably low for applications such as $CO_2$ gas monitoring, anesthesia gas monitoring, $N_2O$ gas monitoring, and tissue spectroscopy.

Electrode lamps are known in the art for visible illumination purposes but they are neither designed to be pulsed at high frequencies nor are they designed as sources of infrared radiation. See, e.g., U.S. Pat. Nos. 4,633,128 and 5,399,931.

SUMMARY OF THE INVENTION

It is therefore an object of this invention to provide a high frequency infrared radiation source.

It is a further object of this invention to provide such a high frequency infrared radiation source which does not require the use of mechanical chopper wheels.

It is a further object of this invention to provide such a high frequency infrared radiation source which does not include a resistive element.

It is a further object of this invention to provide such a high frequency infrared radiation source which can be pulsed at up to two kilohertz or higher.

It is a further object of this invention to provide such a high frequency infrared radiation source which has low power requirements.

It is a further object of this invention to provide such a high frequency infrared radiation source which has better pulse definition.

It is a further object of this invention to provide such a high frequency infrared radiation source which can achieve much higher optical power levels.

The invention results from the realization that a very high frequency (pulsing) infrared radiation source capable of achieving frequencies as high as two kilohertz without moving parts and with very little thermal mass can be effected by eliminating the filaments of prior infrared radiation sources and instead using xenon gas and generating a plasma of the xenon gas between two spaced electrodes to emit infrared radiation and then replacing any glass optical elements of prior electrode based light sources with a collimating lens and/or window made of materials which transmit infrared radiation.

This invention features a high frequency infrared radiation source comprising a hermetically sealed chamber with a plasma generating gas therein, a pair of spaced electrodes in the chamber for creating a plasma therebetween, a window in the chamber; and a collimating lens made of infrared radiation transmissive material disposed between the pair of electrodes and the window.

One typical plasma generating gas is xenon. In one embodiment, the chamber is defined by a TO can including the window and a TO header which supports the pair of spaced electrodes. In the preferred embodiment, the collimating lens is hemispherical and made of sapphire, zinc selinide, germanium, silicon, magnesium fluoride, calcium fluoride, calcium bromide, or cadmium telluride.

In one embodiment, a window element is sealed over the window and the collimating lens is disposed behind the window element. The window element is made of an infrared transmissive material such as germanium. The window element may be coated with an anti reflective material and include metalization. A sealing material is disposed between the metalization of the window element and the chamber. The sealing material is typically solder or braze.

In another embodiment, the collimating lens is sealed directly over the window. In this embodiment, the collimating lens may include metalization and there is then a sealing material between the metalization of the lens and chamber. The sealing material is typically solder or braze.

In one embodiment, the pair of spaced electrodes are disposed above a support surface. A pair of posts extend upward from the support surface and each have terminal ends which contain an electrode. A reflector may be disposed between the support surface and the electrodes. The reflector may be in the shape of a collimating lens with a flat surface disposed closest to the electrodes and the remainder of the lens coated optically and thermally with a material which reflects infrared radiation. The support surface may include an optically and thermally absorbent coating to remove unwanted radiation.

In one design, the electrodes are disposed horizontally across from each other in the chamber. In another design, the electrodes are disposed vertically with one upper electrode over a lower electrode in the chamber. In this design, a reflector may be located in the chamber surrounding the upper electrode. The reflector typically includes a gold surface.

This invention further features a high frequency infrared radiation source comprising a header, a pair of spaced electrodes supported above the header, a can sealed with respect to the header creating a sealed chamber containing the pair of spaced electrodes, the can having a window therein, a gas in the chamber which creates a plasma between the electrodes, and an optical path from the plasma through the window including only materials which transmit infrared radiation.

In one embodiment, the window is an opening in the can and an infrared transmissive element is sealed over or under the opening. In another embodiment, an infrared transmissive collimating lens is sealed directly over or under the opening.

The plasma generating gas is typically xenon, the header is typically a TO header and the can is then a TO can. A reflector may be disposed between the header and the electrodes. One preferred reflector is in the shape of a collimating lens with a flat surface disposed closest to the electrodes. The collimating lens is typically coated with a material which reflects infrared radiation and the header also includes an absorbent coating thereon.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
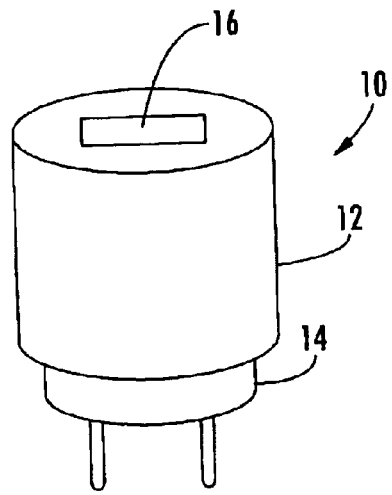
FIG. 1 is a schematic view of the high frequency infrared radiation source in accordance with the subject invention.
Figure 2:
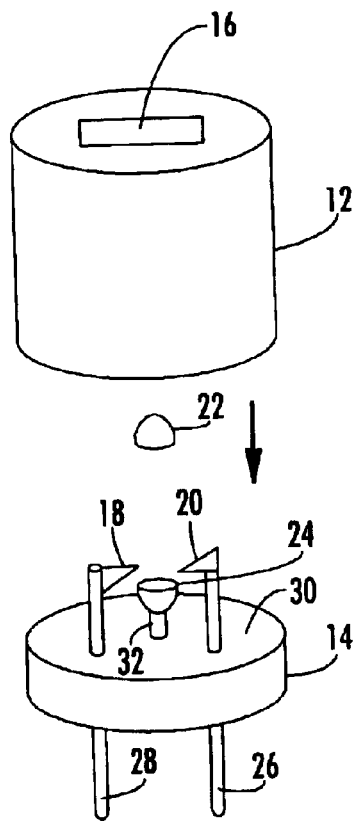
FIG. 2 is a schematic exploded view of the infrared radiation source shown in FIG. 1.

In one embodiment, high frequency radiation source 10, FIGS. 1 and 2 includes TO can 12 hermetically sealed with respect to TO header 14. Can 12 can range from less than ½ inch to over 1 inch in diameter. Inside the chamber defined by can 12 and header 14 is a plasma generating gas such as xenon at an ideal pressure of between 2 to 2½ atmospheres. Above about 3 atmospheres, no additional gain in the infrared radiation is realized unlike ultraviolet light sources where pressures of 4–15 atmospheres is desired. Can 12 includes window 16 over spaced electrodes 18 and 20 which create a plasma therebetween to emit infrared radiation.

Optional collimating lens 22, typically one half of a sapphire ball, thereby defining a hemisphere, may be disposed between window 16 and electrodes 18 and 20 in order to collimate infrared radiation directed out through window 16.

In one embodiment, collimating lens 22 is the only optical element and thus is sealed with respect to window 16. In another embodiment, a second optical element in the form of a germanium window element spans window 16 sealing it and the collimating lens is then disposed behind the germanium window element. In either embodiment, the optical path from the plasma generated between electrodes 18 and 22 and through window 16 only includes materials, if any, which are transmissive to infrared radiation. In the prior art, in contrast, many light sources contained glass optical elements (a lens, window, or the like) which blocked infrared radiation.

One example, reflector 24 is disposed beneath electrodes 18 and 20. Reflector 24 may be the other half of the sapphire ball lens with the flat surface facing upwards closest to the electrodes as shown. The remainder of this collimating lens is coated with a material which reflects infrared radiation such as gold. In other embodiments, reflector 24 is simply a concave reflective surface coated with material which reflects infrared radiation such as gold.

As shown, header 14 includes terminals or posts 26 and 28 which extend upwards from platform or support surface 30. The terminal ends of posts 26 and 28 are fitted with electrodes 18 and 20 respectively. One electrode is typically made of tungsten; the other 80% dense tungsten impregnated with Barium. Support surface 30 is preferably coated with an infrared radiation absorbent material such as infrared absorbent black paint. Reflector 24 is supported above platform 30 by support structure 32.

Figure 3:
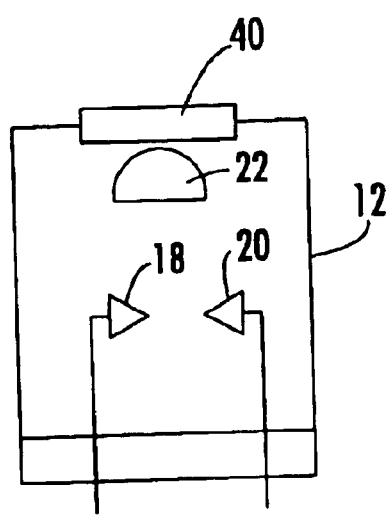
FIG. 3 is a cross sectional schematic view of one embodiment of the high frequency radiation source of the subject invention.
Figure 4:
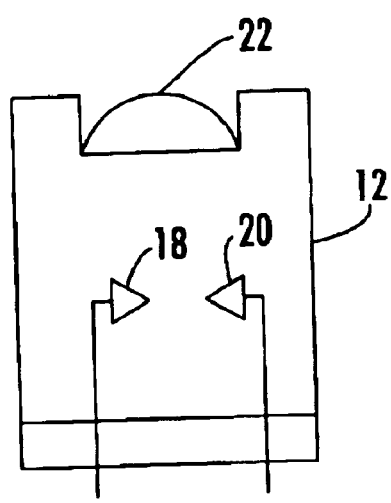
FIG. 4 is a cross sectional schematic view of another embodiment of the high frequency infrared radiation source of this invention.

In the design shown in FIG. 3, germanium element 40 is sealed about the window opening in TO can 12 and collimating lens 22 is fixed in place just behind window element 40. In contrast, in the design shown in FIG. 4, collimating lens 22 is sealed about the window in TO can 12 and there is no other optical elements except collimating lens 22.

Figure 5:
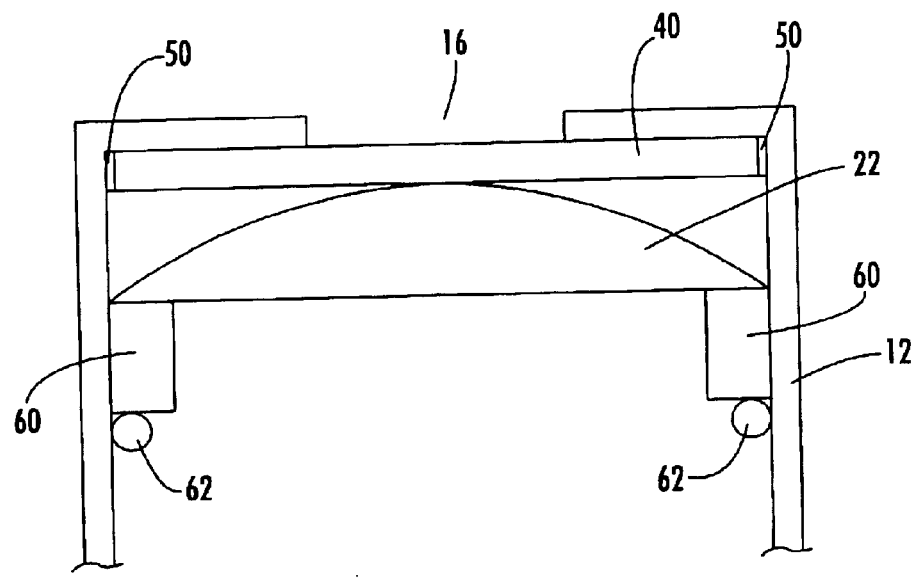
FIG. 5 is a more detailed cross sectional view of one portion of the embodiment shown in FIG. 3.

In the former design, window element 40, FIG. 5 is coated with an anti-reflective infrared radiation material such as Ge, silicon, or ZnSe and includes metalization on the periphery thereof such as Ti, Ni, Au, or CrNiAu. A sealing material 50, such as solder or braze, then hermetically seals window element 40 with respect to the interior of TO can 12. Collimating lens 22 then resides right behind window element 40 held in place by lens holder structure 60 which urges collimating lens 22 adjacent window element 40 and then sealed in place in TO can 12 by sealing ring 62.

Figure 6:
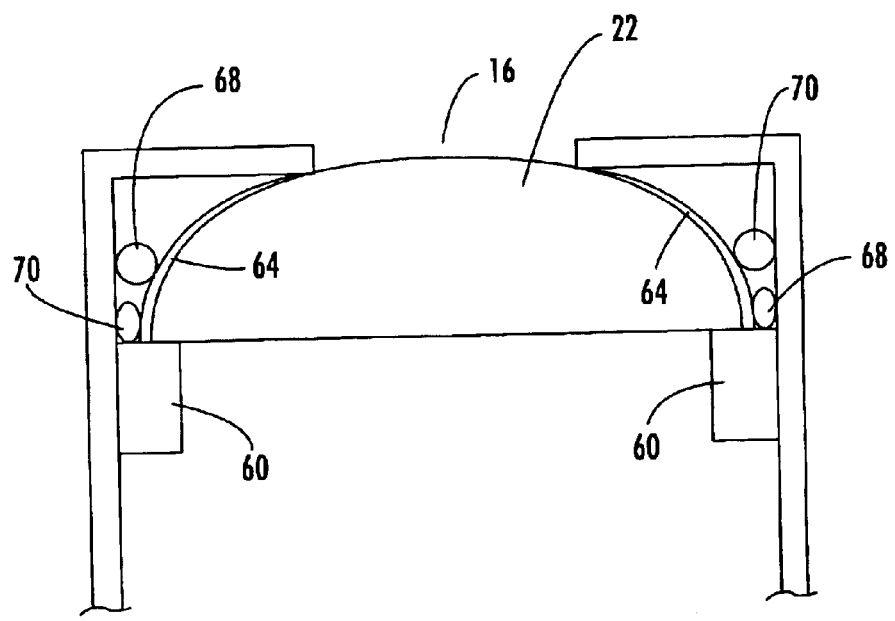
FIG. 6 is a more detailed cross sectional view of one portion of the embodiment shown in FIG. 4.

In the latter design, collimating lens 22, FIG. 6 is hermetically sealed with respect to window 16 by metalization in areas 64 of lens 22 and solder or braze sealing material 68 and 70.

Figure 7:
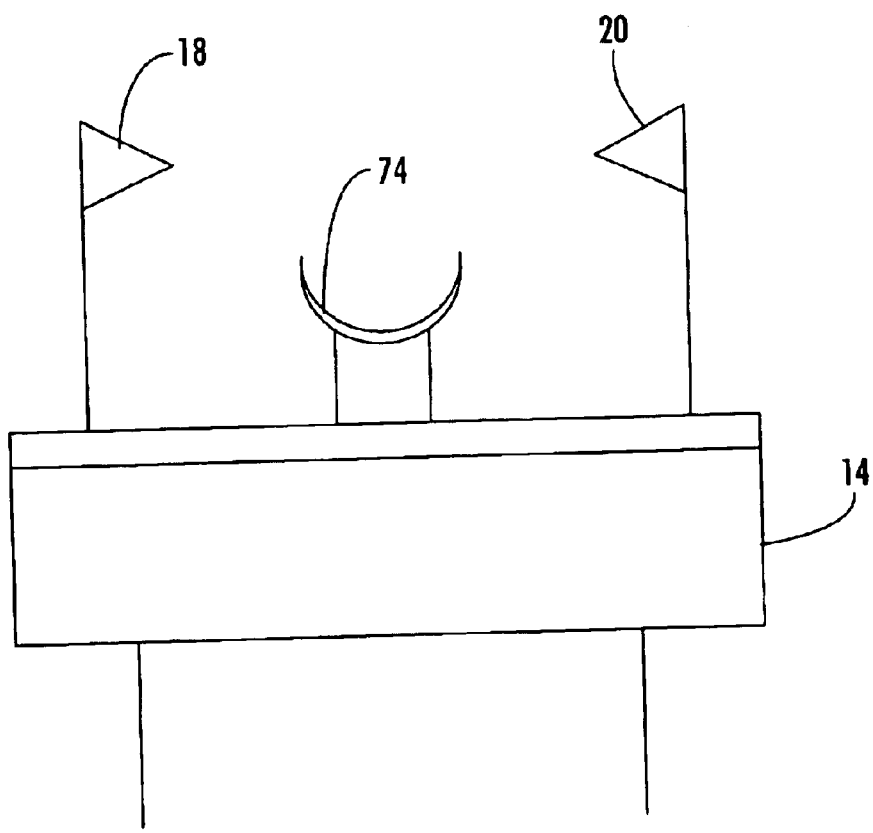
FIG. 7 is a schematic illustrative view showing the header for the high frequency infrared radiation source in accordance with one embodiment of the subject invention.

As shown in the design of FIG. 7, reflector element 74 is concave and is preferably gold coated. In this design, the support surface of header 14 includes an infrared absorbent coating such as absorptive black paint or molymanganese. Collimating lens 22, FIGS. 1–6 is not limited to a hemispherical shaped lens made of sapphire, however. In other embodiments, any shape concave or convex may be used as the lens made out of sapphire, zinc selenide, germanium, silicon, magnesium fluoride, calcium fluoride, calcium bromide, and calcium telluride.

Figure 8:
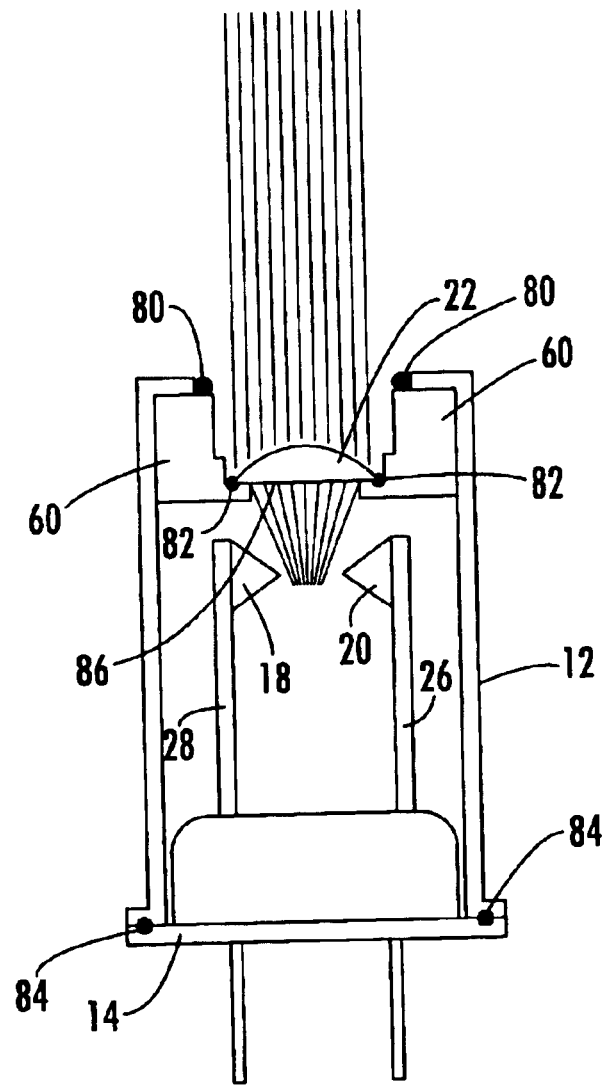
FIG. 8 is a schematic cross sectional view showing one embodiment of the high frequency infrared radiation source of the subject invention.

In one preferred embodiment, laser weld 80, FIG. 8 secures holder 60 in place in TO can 12 and braze seal 82 seals 5 mm hemispherical lens 22 with respect to holder 60. Weld 84 seals TO can 12 to TO header 14. Surface 86 of lens 22 is either sapphire or ZnSe and/or optically coated with an infrared AR coating for the wavelength of interest.

Figure 9:
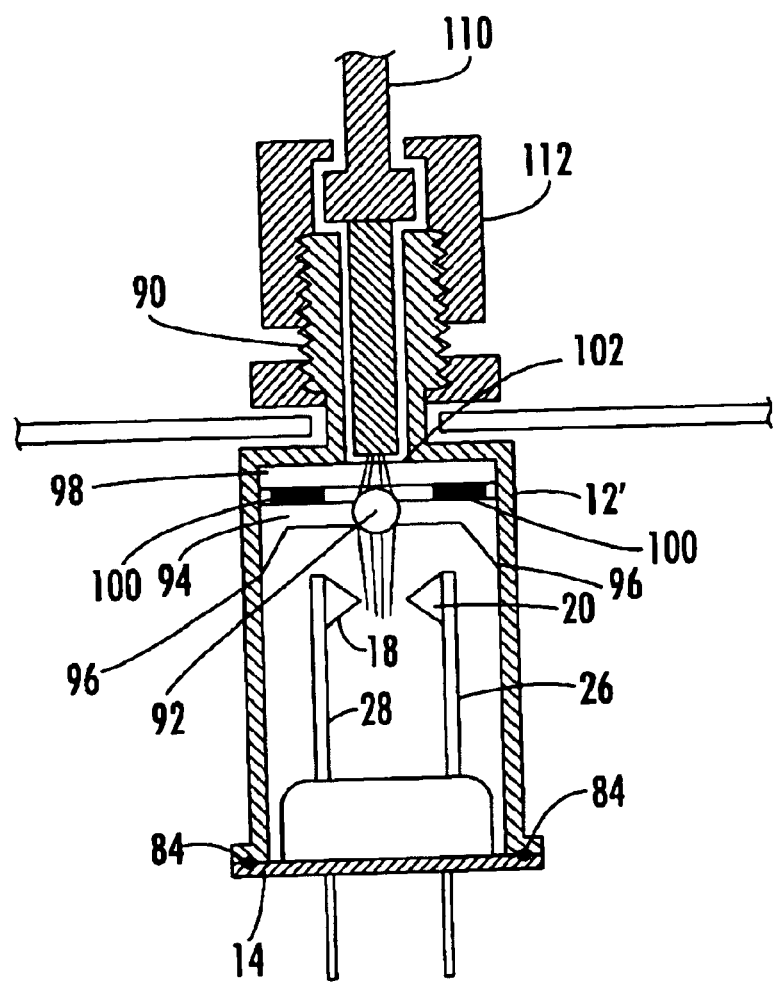
FIG. 9 is a schematic cross sectional view showing another embodiment of the high frequency infrared radiation source of the subject invention.

In another embodiment, TO can 12', FIG. 9 includes fiber bundle fixture 90. In this embodiment, a 2 mm diameter ball sapphire lens 92 is held in position by metal holder 94 which is welded in place in TO can 12' by laser weld 96. Sapphire window element 98 is held in place by glass to metal sealing frit 100 and may be coated with an optical antireflective coating or coating for solarization on top surface 102. Fiber bundle 110 is couple to fixture 90 via coupler 112.

Figure 10:
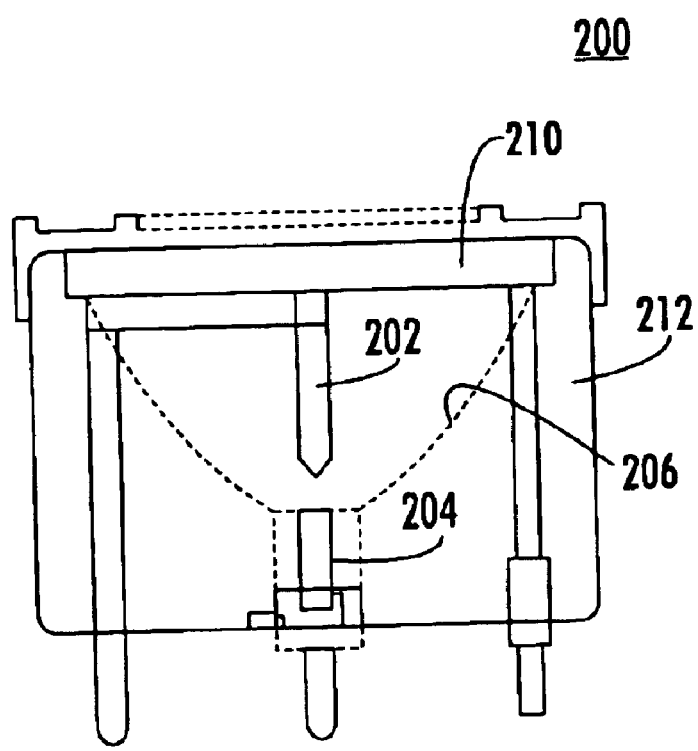
FIG. 10 is a schematic cross sectional view of still another embodiment of the high frequency infrared radiation source of the subject invention.

Thus far, the electrodes are shown to be disposed horizontally across from each other in the chamber. This configuration, however, is not a limitation of the subject invention. Infrared radiation source 200, FIG. 10 includes vertically disposed upper electrode (cathode) 202 made of 80% dense tungsten impregnated with barium and vertically disposed lower electrode (anode) 204 made of pure tungsten. Gold coated reflector 206 surrounds upper electrode 202. Window element 210 may be made of sapphire or some other infrared transmissive material. In this embodiment, housing 212 is ceramic. See U.S. Pat. Nos. 4,633,128 and 5,399,931 incorporated herein by this reference.

In order to properly operate in a high frequency (2–10 kilohertz) mode, however, several modifications need to be made to the design criteria associated with prior art visible light emitting arc lamps. First, as explained above, the xenon gas fill pressure need only be between 2–2½ atmospheres. After about 3 atmospheres, no additional gain is realized and, as a result, triggering of the plasma is now much easier. Also, as stated above, no infrared blocking materials can be in the optical path from the plasma between the electrodes and through the window. Gold rather than silver as reflector surface 206 is better for infrared radiation. Also, in the pulsed mode, the shape of the electrodes must be redesigned. Electrode tips which are too sharp burn out too quickly while on the other hand, electrode tips which are too blunt sputter uncontrollably. Accordingly, an electrode tip angle of about 60° with a small flat is preferable. The spacing between the electrodes is now about ½ mm rather than as much as 40 mm in the prior art. To our knowledge, no one has ever considered using arc lamps as sources of infrared radiation and those skilled in the art will appreciate that the prior art is directed to visible light arc lamps and therefore does not teach or suggest the unique design criteria associated with pulsed infrared radiation source arc lamps disclosed herein.

Such a high frequency infrared radiation source, in any embodiment, is useful for $CO_2$ gas monitoring, anesthesia gas monitoring, $N_2O$ gas monitoring, and tissue spectroscopy. A 1 microsecond pulse edge can be used for high speed applications where repetition rates of 2 kilohertz or higher are possible. The high frequency infrared radiation source of this invention has lower power requirements than a glow bar because of the AC nature and can be pulsed at a high frequency unlike filament type infrared radiation sources. The high frequency infrared radiation source of the subject invention also exhibits a better definition and much higher optical power levels can be achieved. No moving parts are required and there is very little thermal mass by eliminating the filaments of prior art infrared radiation sources and instead using xenon gas to generate a plasma between two spaced electrodes which then emits infrared radiation. In this invention, the typical infrared blocking optical elements are replaced with a collimating lens and, optionally, a window both made of materials which transmit infrared radiation.

Figure 11:
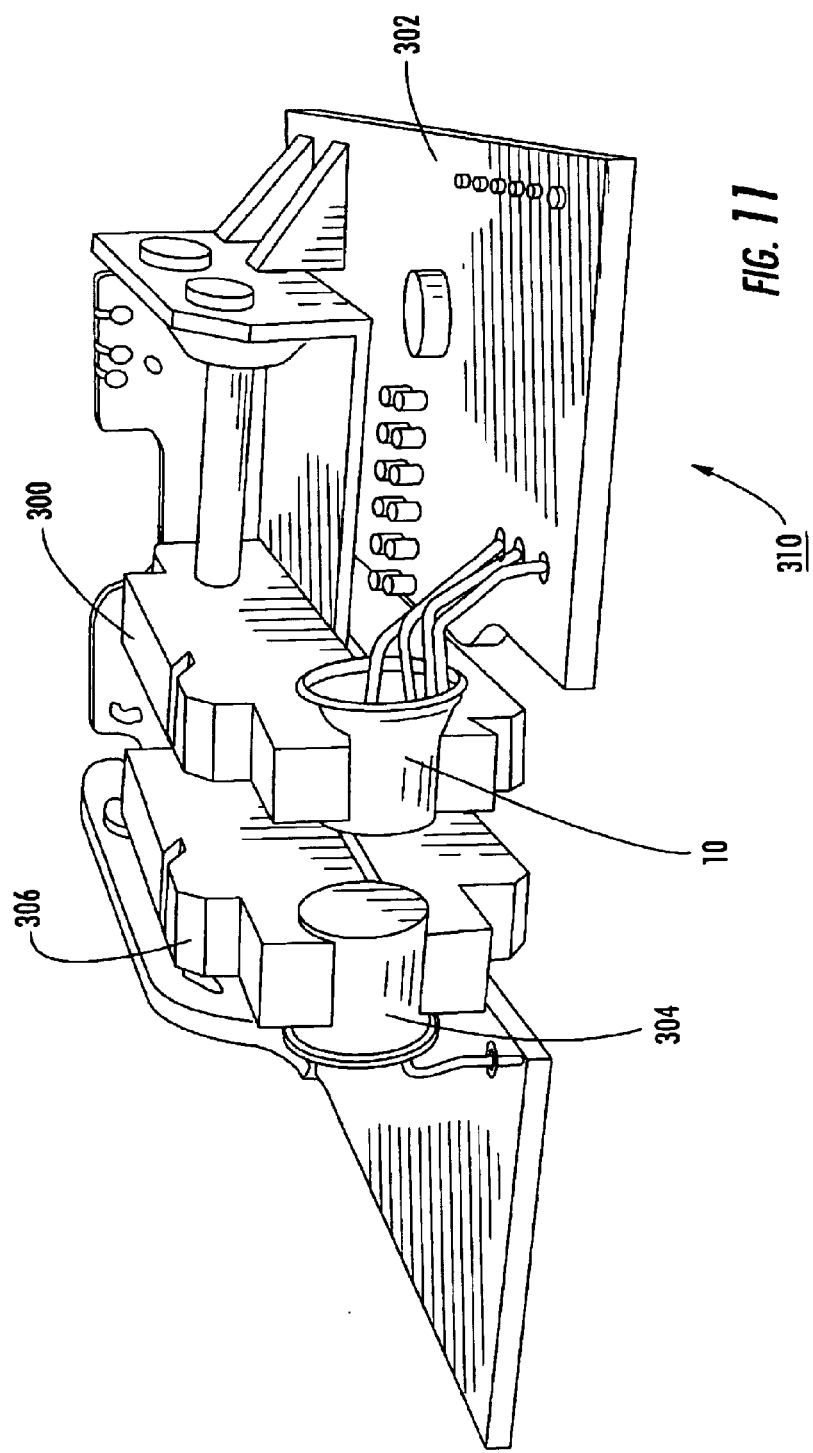
FIG. 11 is a schematic view of a detection system incorporating the high frequency infrared radiation source of the subject invention.

In one embodiment, detection system 310 includes source 10, FIG. 11 held in place by support structure 300 on circuit board 302 across from detector 304 held in place by support structure 306. A sample is then placed or caused to flow between source 10 and detector 304 in a conduit (not shown) and the presence and/or concentration of $CO_2$ or other molecules or particles can be detected or measured automatically.

In the prior art, the infrared radiation source was a resistive type source which could not be pulsed quickly enough to achieve accurate results and/or required the use of a mechanical chopper wheel which increased the size and complexity of the system. In this invention, infrared source 10 can be as small as 0.3 inches in diameter and 0.3 inches long resulting in a small, compact, and portable system.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A high frequency infrared radiation source comprising:
   a hermetically sealed chamber with a plasma generating gas therein;
   a pair of spaced electrodes in the chamber for creating a plasma there between;
   a window in the chamber; and
   a collimating lens made of infrared radiation transmissive material disposed between the pair of electrodes and the window.

2. The high frequency infrared radiation source of claim 1 in which the plasma generating gas is xenon.

3. The high frequency infrared radiation source of claim 1 in which the chamber is defined by a TO can including the window and a TO header which supports the pair of spaced electrodes.

4. The high frequency infrared radiation source of claim 1 in which the collimating lens is hemispherical.

5. The high frequency infrared radiation source of claim 1 in which the material of the collimating lens is selected from the group consisting of sapphire, zinc selinide, germanium, silicon, magnesium fluoride, calcium fluoride, calcium bromide, and cadmium telluride.

6. The high frequency infrared radiation source of claim 1 further including a window element sealed over the window and wherein the collimating lens is disposed behind the window element.

7. The high frequency infrared radiation source of claim 6 in which the window element is made of infrared transmissive material.

8. The high frequency infrared radiation source of claim 6 in which the infrared transmissive material is germanium.

9. The high frequency infrared radiation source of claim 6 in which the window element is coated with an anti reflective material.

10. The high frequency infrared radiation source of claim 6 in which the window element includes metalization and there is a sealing material between the metalization of the window element and the chamber.

11. The high frequency infrared radiation source of claim 10 in which the sealing material is solder or braze.

12. The high frequency infrared radiation source of claim 1 in which the collimating lens is sealed with respect to the window.

13. The high frequency infrared radiation source of claim 12 in which the collimating lens includes metalization and there is a sealing material between the metalization of the lens and chamber.

14. The high frequency infrared radiation source of claim 13 in which the sealing material is solder or braze.

15. The high frequency infrared radiation source of claim 1 in which the pair of spaced electrodes are disposed above a support surface.

16. The high frequency infrared radiation source of claim 15 further including a pair of posts extending upward from the support surface each having terminal ends which contain an electrode.

17. The high frequency infrared radiation source of claim 15 further including a reflector disposed between the support surface and the electrodes.

18. The high frequency infrared radiation source of claim 17 in which the reflector is in the shape of a collimating lens with a flat surface disposed closest to the electrodes and the remainder of the lens coated with a material which reflects infrared radiation.

19. The high frequency infrared radiation source of claim 15 in which the support surface includes an absorbent coating.

20. The high frequency infrared radiation source of claim 1 in which the electrodes are disposed horizontally across from each other in the chamber.

21. The high frequency infrared radiation source of claim 1 in which the electrodes are disposed vertically with one upper electrode over a lower electrode in the chamber.

22. The high frequency infrared radiation source of claim 21 further including a reflector in the chamber surrounding the upper electrode.

23. The high frequency infrared radiation source of claim 22 in which the reflector includes a gold surface.

24. A high frequency infrared radiation source comprising:

a header;

a pair of spaced electrodes supported above the header;

a can sealed with respect to the header creating a sealed chamber containing the pair of spaced electrodes, the can having a window therein;

a gas in the chamber which creates a plasma between the electrodes; and an optical path from the plasma through the window including only materials which transmit infrared radiation.

25. The high frequency infrared radiation source of claim 24 in which the window is an opening in the can.

26. The high frequency infrared radiation source of claim 24 further including an infrared transmissive element sealed over the opening.

27. The high frequency infrared radiation source of claim 24 further including an infrared transmissive collimating lens sealed over the opening.

28. The high frequency infrared radiation source of claim 24 further including both an infrared transmissive element sealed over the opening and an infrared transmissive collimating lens adjacent the transmissive element.

29. The high frequency infrared radiation source of claim 24 in which the gas in the chamber which creates a plasma is xenon.

30. The high frequency infrared radiation source of claim 24 in which the header and the can is a TO can.

31. The high frequency infrared radiation source of claim 24 further including a reflector disposed between the header and the electrodes.

32. The high frequency infrared radiation source of claim 31 in which the reflector is in the shape of a collimating lens with a flat surface disposed closest to the electrodes.

33. The high frequency infrared radiation source of claim 32 in coated with a material which reflects infrared radiation.

34. The high frequency infrared radiation source of claim 24 in which the header includes an optically absorbent coating thereon.

* * * * *